(12) United States Patent
Shinoda

(10) Patent No.: US 10,261,645 B2
(45) Date of Patent: *Apr. 16, 2019

(54) TOUCH SENSING DEVICE

(71) Applicant: HOSIDEN CORPORATION, Yao-shi, Osaka (JP)

(72) Inventor: Koji Shinoda, Yao (JP)

(73) Assignee: HOSIDEN CORPORATION, Yao-Shi, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/788,106

(22) Filed: Oct. 19, 2017

(65) Prior Publication Data

US 2018/0113533 A1 Apr. 26, 2018

(30) Foreign Application Priority Data

Oct. 25, 2016 (JP) .................................. 2016-208523

(51) Int. Cl.
*G06F 3/044* (2006.01)

(52) U.S. Cl.
CPC .................................. *G06F 3/044* (2013.01)

(58) Field of Classification Search
CPC ............... G06F 3/0044; G06F 3/04883; G06F 3/04886; G06F 3/0488; G06F 2203/04104; G06F 3/03547; G06F 3/041
See application file for complete search history.

(56) References Cited

U.S. PATENT DOCUMENTS

2008/0309633 A1* 12/2008 Hotelling .............. G06F 3/0412
345/173

2009/0002337 A1* 1/2009 Chang .................... G06F 3/044
345/174

(Continued)

FOREIGN PATENT DOCUMENTS

CN 203812221 U 9/2014
EP 2602698 A1 6/2013

(Continued)

OTHER PUBLICATIONS

Extended European Search Report for Application No. EP 17020469.7, published by the European Patent Office (EPO), dated Jan. 24, 2018, including corresponding Communication, 2-page Annex, Information on Search Strategy, and 7-page EPO Form 1703.

(Continued)

*Primary Examiner* — Sanjiv D. Patel
(74) *Attorney, Agent, or Firm* — Kilyk & Bowersox, P.L.L.C.

(57) ABSTRACT

A touch sensing device including first electrodes and second electrodes. The first electrodes at a first height position are spaced apart along a first direction and each include an electrode body of strip shape extending in a second direction. The electrode body of each first electrode includes first overlapping portions. The second electrodes at a second height position are spaced apart along the second direction and intersect the first electrodes. Each second electrode includes wide portions and narrow portions. The wide portions of each second electrode are spaced apart along the first direction and include pairs of adjacent wide portions. The adjacent wide portions of each pair are located adjacent to each other in the first direction. Each narrow portion is smaller in the second direction than each wide portion, interconnects the adjacent wide portions of a corresponding pair, and overlaps a corresponding one of the first overlapping portions.

21 Claims, 6 Drawing Sheets

(56) References Cited

U.S. PATENT DOCUMENTS

| | | | | |
|---|---|---|---|---|
| 2009/0085885 A1* | 4/2009 | Wu | ............ | G06F 3/041 345/173 |
| 2011/0175846 A1* | 7/2011 | Wang | ............ | G06F 3/0412 345/174 |
| 2013/0120303 A1* | 5/2013 | Hong | ............ | G06F 3/0412 345/173 |
| 2013/0141357 A1* | 6/2013 | Lo | ............ | G06F 3/044 345/173 |
| 2013/0342503 A1* | 12/2013 | Chen | ............ | G06F 3/044 345/174 |
| 2014/0035602 A1* | 2/2014 | Nagarajan | ............ | G06F 3/044 324/686 |
| 2014/0218335 A1 | 8/2014 | Teranishi et al. | | |
| 2015/0220181 A1* | 8/2015 | Jung | ............ | G06F 3/044 345/174 |
| 2015/0370368 A1 | 12/2015 | Yokohama et al. | | |

FOREIGN PATENT DOCUMENTS

| | | |
|---|---|---|
| JP | 2014153840 A | 8/2014 |
| JP | 2016009213 A | 1/2016 |
| WO | 2005114369 A2 | 12/2005 |
| WO | 2015025487 A1 | 2/2015 |

OTHER PUBLICATIONS

Notification of Reasons for Refusal (Office Action) for Japanese Patent Application No. 2016-208523 issued by the Japan Patent Office (JPO), dated Sep. 5, 2018, including English-language translation, 8 pages.

* cited by examiner

TOUCH SENSING DEVICE

CROSS-REFERENCE TO RELATED APPLICATION

The present application claims priority under 35 U.S.C. § 119 of Japanese Patent Application No. 2016-208523 filed on Oct. 25, 2016, the disclosure of which is expressly incorporated by reference herein in its entirety.

BACKGROUND OF THE INVENTION

Technical Field

The invention relates to touch sensing devices.

Background Art

US Patent Application Publication No. 2008/0309633 discloses a conventional capacitive touch sensing device. The touch sensing device includes: a plurality of first electrodes arrayed at a first height position in spaced relation; and a plurality of second electrodes arrayed at a second height position in spaced relation and intersecting the first electrodes. The first and second height positions are different height positions.

SUMMARY OF INVENTION

The first electrodes and the second electrodes are electrostatically coupled at their intersections. When a detection target, such as a finger and a stylus, approaches one or more of the intersections, there are changes in electrostatic capacitance at the approached intersections. In response to an electrostatic capacitance changes, an output signal from the second electrode at the intersection changes. A detector IC, which is electrically connected to the second electrode, amplifies the output signal from the second electrode and determines whether or not a value of the output signal exceeds a threshold value.

If the detector IC amplifies the output signal from the second electrode to a large extent in order to improve detection sensitivity of the touch sensing device, the amplified output signal will exceed an upper limit value of the detector IC.

In the above circumstances, the invention provides a touch sensing device with enhanced detection sensitivity.

A touch sensing device of an aspect of the invention includes a plurality of first electrodes and a plurality of second electrodes. The first electrodes are arrayed at a first height position in spaced relation along a first direction. Each first electrode includes an electrode body of strip shape extending in a second direction at a first height position. The second direction intersects the first direction. The electrode body of each first electrode includes a plurality of first overlapping portions. The second electrodes are arrayed at a second height position in spaced relation along the second direction and intersect the first electrodes. The second height position is different from the first height position. Each second electrode includes a plurality of wide portions and a plurality of narrow portions. The wide portions of each second electrode are arrayed at the second height position in spaced relation along the first direction and include pairs of adjacent wide portions. The adjacent wide portions of each pair are located adjacent to each other in the first direction. The narrow portions of each second electrode are located at the second height position. Each narrow portion is smaller in dimension in the second direction than each wide portion, interconnects the adjacent wide portions of a corresponding pair, and overlaps a corresponding one of the first overlapping portions of the first electrodes.

The touch sensing device of this aspect provides improved detection sensitivity for the following reason. The strip-shaped electrode bodies of the first electrodes extend in the second direction and have the first overlapping portions respectively overlapped by the narrow portions of the second electrodes, i.e. the overlapping areas of the first electrodes and the second electrodes are relatively small. Accordingly, even if the touch sensing device is configured such that signals output either from the first electrodes or the second electrodes are input into the detector and amplified by the detector, a possibility is reduced that the amplified signals exceed the upper limit value set in the detector. This makes it possible to amplify signals output from the first or second electrodes to a maximum degree, resulting in improved sensitivity of the touch sensing device.

The second electrodes may include pairs of adjacent second electrodes. The adjacent second electrodes of each pair may be located adjacent to each other in the second direction with a plurality of empty regions therebetween. Each empty region may be defined by a pair of paired narrow portions and a set of quaternary wide portions. The paired narrow portions of each pair may consist of two of the narrow portions that are adjacent in the second direction. The quaternary wide portions of each set may consist of four of the wide portions and include two wide portions located next to, and on one side of the first direction relative to, the corresponding paired narrow portions; and the other two wide portions located next to, and on the other side of the first direction relative to, the paired narrow portions.

The electrode body of each of the first electrodes may further include a plurality of second overlapping portions. Each of the second overlapping portions may be located between corresponding two of the first overlapping portions and may overlap a corresponding one of the empty regions at the first height position. The touch sensing device may further include a plurality of second dummy electrodes. Each of the empty regions may be provided with at least one of the second dummy electrodes at the second height position. The at least one second dummy electrode in each empty region may electrically float and overlap a corresponding one of the second overlapping portions of the first electrodes. In the touch sensing device of this aspect, each narrow portion of the second electrode overlaps the first overlapping portion of the electrode body of the first electrode, and the at least one second dummy electrode in each empty region overlaps a corresponding one of the second overlapping portions of the first electrodes. This arrangement improves invisibility of the first electrodes, i.e. the wiring pattern of the first electrodes is unlikely to be visible from outside of the touch sensing device.

In each set of the quaternary wide portions, the two wide portions may have end portions that are adjacent in the second direction and extend along, and directly on the one side of the first direction relative to, the corresponding one of the second overlapping portions that overlaps the corresponding empty region. The other two wide portions may have end portions that are adjacent in the second direction and extend along, and directly on the other side of the first direction relative to, the corresponding one of the second overlapping portions that overlaps the corresponding empty region.

In the touch sensing device of this aspect, variation in detection sensitivity is suppressed throughout the detection plane compared to conventional devices, such as a touch sensing device of a comparative example (not shown) having reed/strip shaped first electrodes in parallel arrangement and reed/strip shaped second electrodes arranged orthogonally to, and at a different height position from, the first electrodes. In this comparative example, electrostatic coupling is strong at the intersections of the first and second electrodes, leading to relatively higher detection sensitivity at such intersections. On the other hand, electrostatic coupling is weak at areas without the first and second electrodes, leading to relatively lower detection sensitivity at such areas, i.e. different detection sensitivity from that at the intersections. This is in contrast with the touch sensing device of this aspect, the quaternary wide portions of each set are configured such that the end portions of the two wide portions that are adjacent in the second direction and the end portions of the other two wide portions that are adjacent in the second direction can be electrostatically coupled to the corresponding one of the second overlapping portions. This arrangement makes it possible to detect an approach of a detection target to an overlapping area of a first overlapping portion of a first electrode and the corresponding narrow portion of the second electrode but also to an area including a second overlapping portion of a first electrode and corresponding quaternary wide portions of the second electrode.

Each of the first electrodes may further include a plurality of first branches. Each first branch may extend at the first height position from a corresponding one of the first overlapping portions of the electrode body so as to overlap a part of one of the second electrodes that is next to said first overlapping portion.

Minimizing overlapping areas of the narrow portions of the second electrodes and the first overlapping portions of the first electrodes may cause excessive reduction in electrostatic capacitance of each intersecting pair of first and second electrodes. Such excessive reduction is alleviated in the touch sensing device of the above aspect for the following reason. As each first branch overlaps a part of a corresponding second electrode, it is possible to enlarge the overlapping area of each intersecting pair of first and second electrodes and thereby adjust the electrostatic capacitance of the intersecting first and second electrodes to a desired value.

The first electrode may include a plurality of second branches in place of, or in addition to, the first branches. The second branches may each extend at the first height position from a corresponding one of the second overlapping portions of the electrode body so as to overlap a corresponding one of the wide portions that is next to said second overlapping portion.

In the touch sensing device of this aspect, each second branch overlaps and is thereby electrostatically coupled to a wide portion. This arrangement leads to improved detection sensitivity in the vicinity of the second branches.

The wide portions of each second electrode may include a plurality of first wide portions and a plurality of second-wide portions. The first and second-wide portions may be alternately arrayed in spaced relation along the first direction at the second height position and may be staggered in the second direction. The first wide portions may each include a first region on one side in the second direction and a second region on the other side in the second direction. The second-wide portions may each include a first region on the other side of the second direction and a second region on the one side of the second direction. In each second electrode, the second regions of the first wide portions and the second regions of the second-wide portions may coincide along the first direction. The adjacent second electrodes of each pair may include one and the other second electrodes. The first regions of the first wide portions of the one second electrode and the first regions of the second-wide portions of the other second electrode may coincide along the first direction. The sum of the total area of the first regions of the first wide portions of all the second electrodes and the total area of the first regions of the second-wide portions of all the second electrodes may occupy 10% to 90% of the total area of all the second electrodes.

This aspect of the invention suppresses variation in detection sensitivity throughout the detection plane for the following reasons. Each of the first regions of the first wide portions of the one second electrode and each of the first regions of the second-wide portions of the other second electrode coincide along the first direction, and the sum of the total area of all the first regions of the first wide portions and the total area of all the first regions of the second-wide portions occupies 10% to 90% of the total area of all the second electrodes. In other words, each pair of the adjacent second electrodes are arranged such that the in-between areas between the second regions of the first wide portions of the one second electrode and the first regions of the first wide portions of the other second electrode (i.e. the in-between areas between the adjacent first wide portions in the second direction) are located close to the respective intersections where the narrow portions connected to the first wide portions of the one second electrode cross the corresponding first overlapping portions of the first electrodes; and likewise, the in-between areas between the first regions of the second-wide portions of the one second electrode and the second regions of the second-wide portions of the other second electrode (i.e. the in-between areas between the adjacent second-wide portions in the second direction) are located close to the respective intersections where the narrow portions connected to the second-wide portions of the other second electrode cross the corresponding first overlapping portions of the first electrodes. In this arrangement, when a detection target approaches one of the above-described adjacent first wide portions, the nearest intersection can detect the approach, and when a detection target approaches one of the above-described adjacent second-wide portions, the nearest intersection can detect the approach. This leads to reduced variation in detection sensitivity from the above in-between areas to the above intersections.

The first electrodes may include pairs of adjacent first electrodes. The adjacent first electrodes of each pair may be located adjacent to each other in the first direction. The touch sensing device may further include a plurality of first dummy electrodes including a plurality of sets of first dummy electrodes. The first dummy electrodes of each set may be located at the first height position between two adjacent ones of the first electrodes leaving narrow clearances from each of said two first electrodes. In the touch sensing device of this aspect, the first dummy electrodes of each set between two adjacent ones of the first electrodes partly overlap the corresponding second electrode. This arrangement reduces electromagnetic interference with the second electrodes from the first-dummy-electrode side.

An electrostatic capacitance value of each intersecting pair of the first electrodes and the second electrodes may be in a range of 0.1 pF to 5 pF.

BRIEF DESCRIPTION OF DRAWINGS

The present invention can be even more fully understood with the reference to the accompanying drawings which are intended to illustrate, not limit, the present invention.

DESCRIPTION OF EMBODIMENTS

Figure 1A:
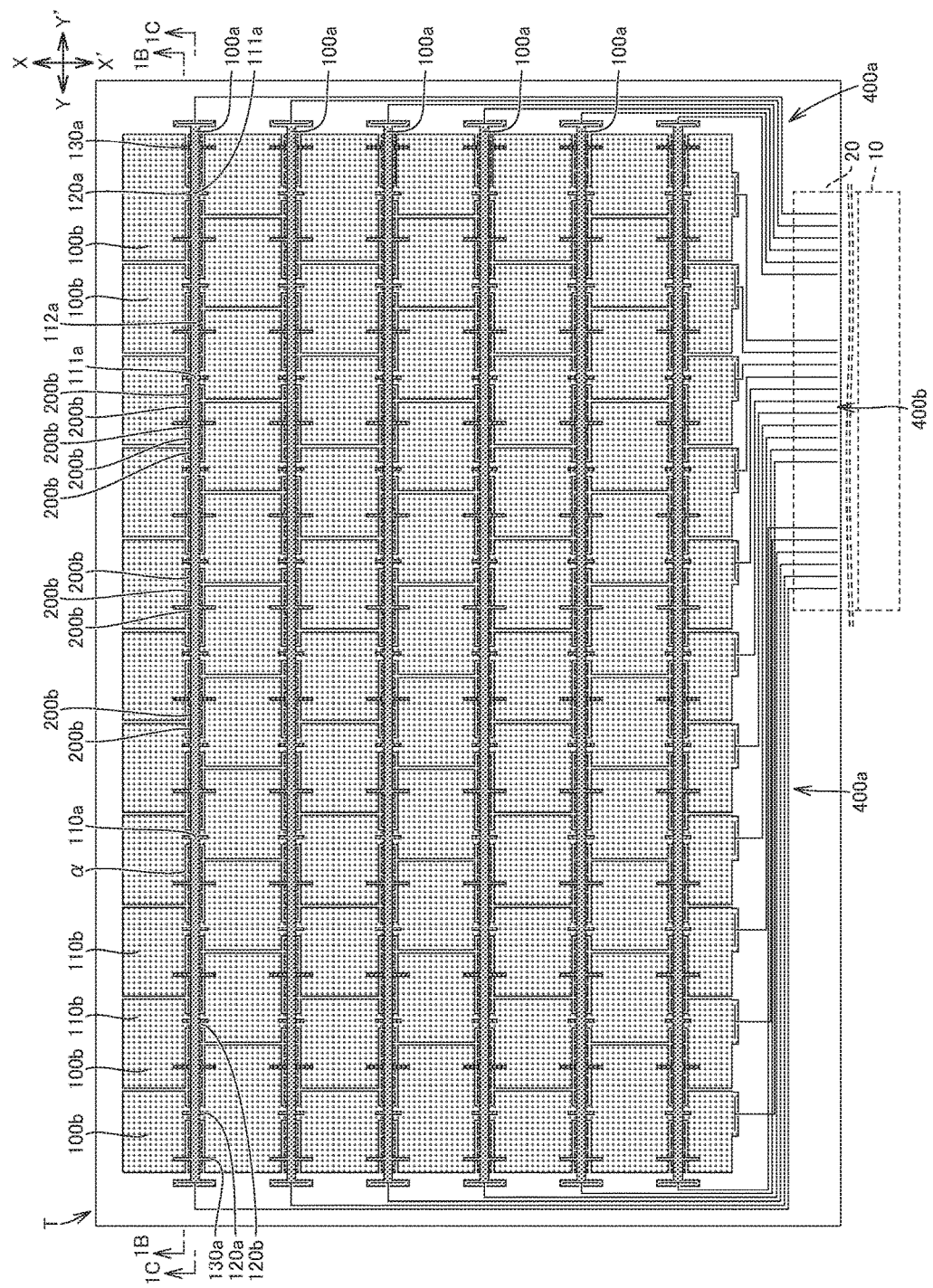
FIG. 1A is a schematic enlarged plan view of a touch sensing device according to a first embodiment of the invention, without showing peripheral ground electrodes.
Figure 1B:
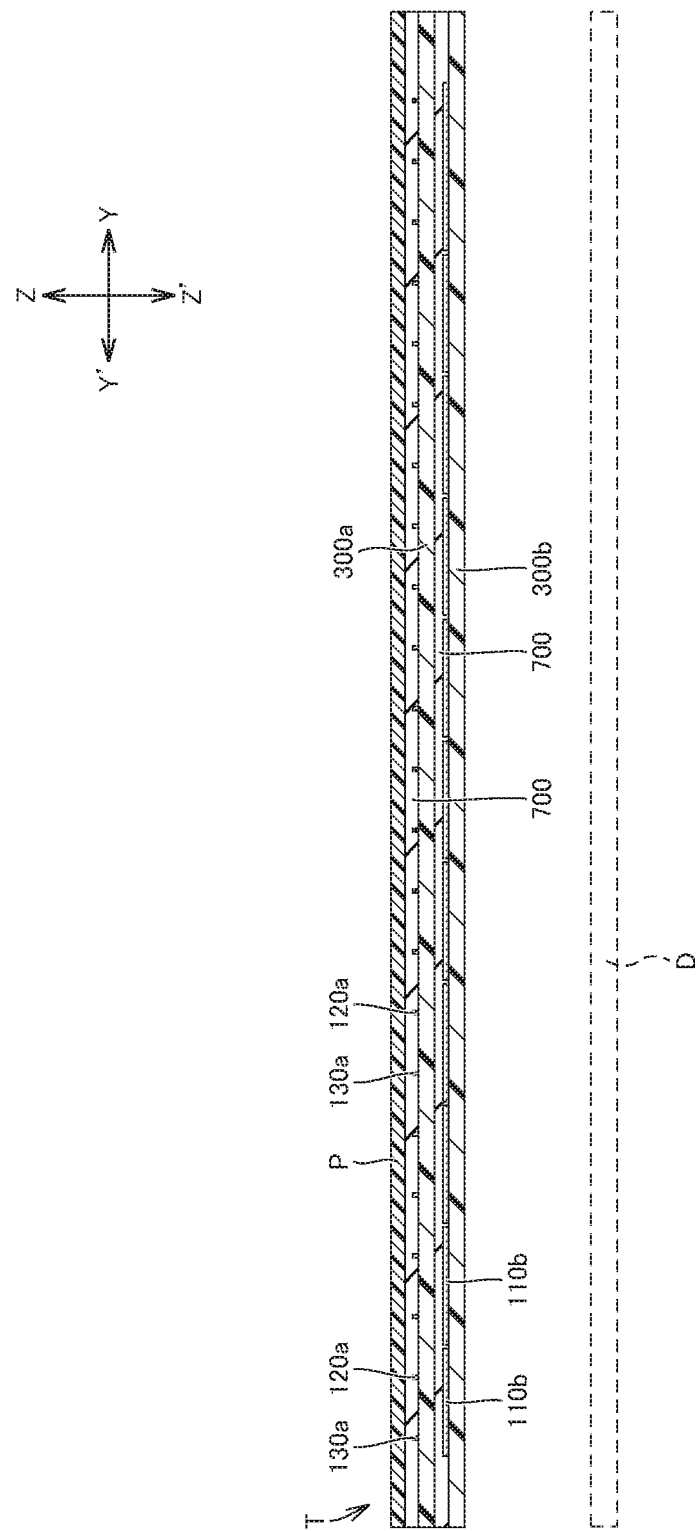
FIG. 1B is an enlarged intersect-sectional view of the touch sensing device of the first embodiment, which is taken along line 1B-1B in FIG. 1A and illustrates a positional relationship between the touch sensing device and an image display device.
Figure 1C:
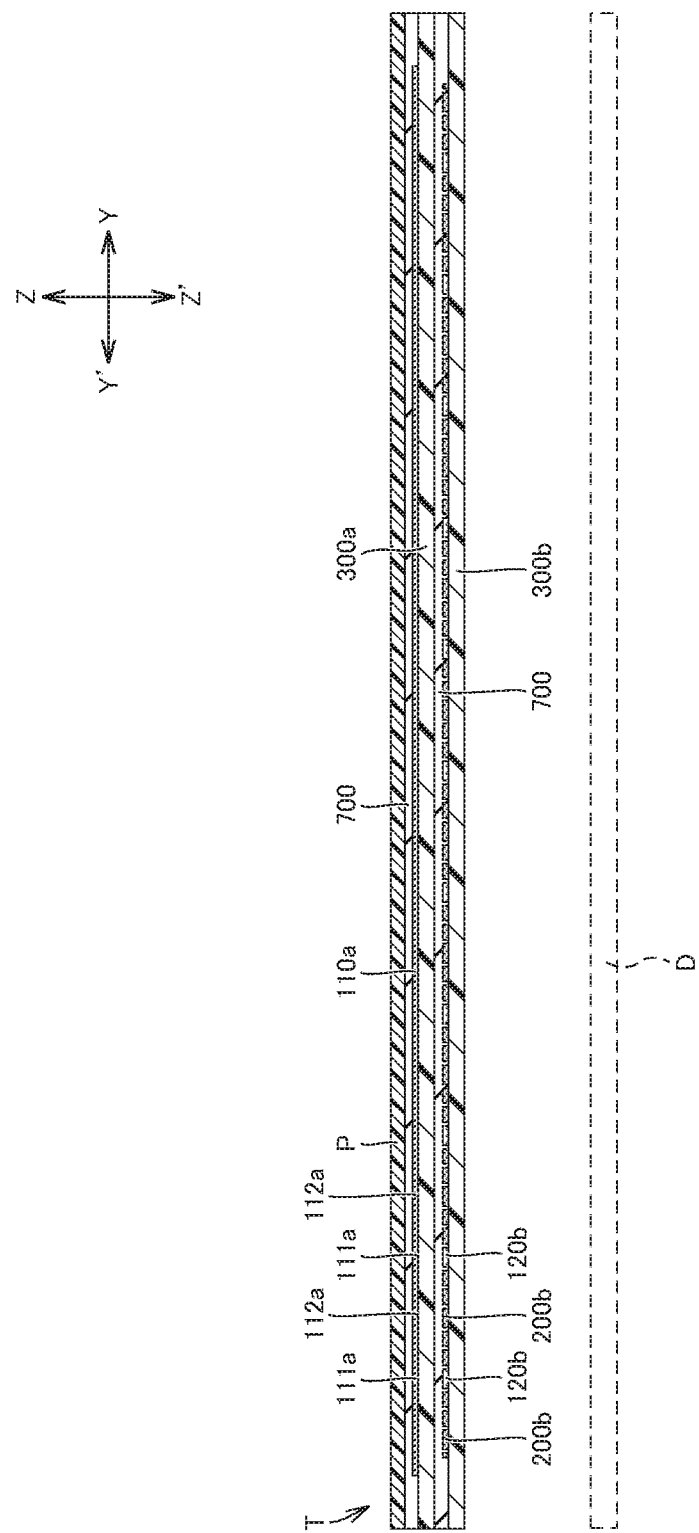
FIG. 1C is an enlarged intersect-sectional view of the touch sensing device of the first embodiment, which is taken along line 1C-1C in FIG. 1A and illustrates the positional relationship between the touch sensing device and the image display device.
Figure 2A:
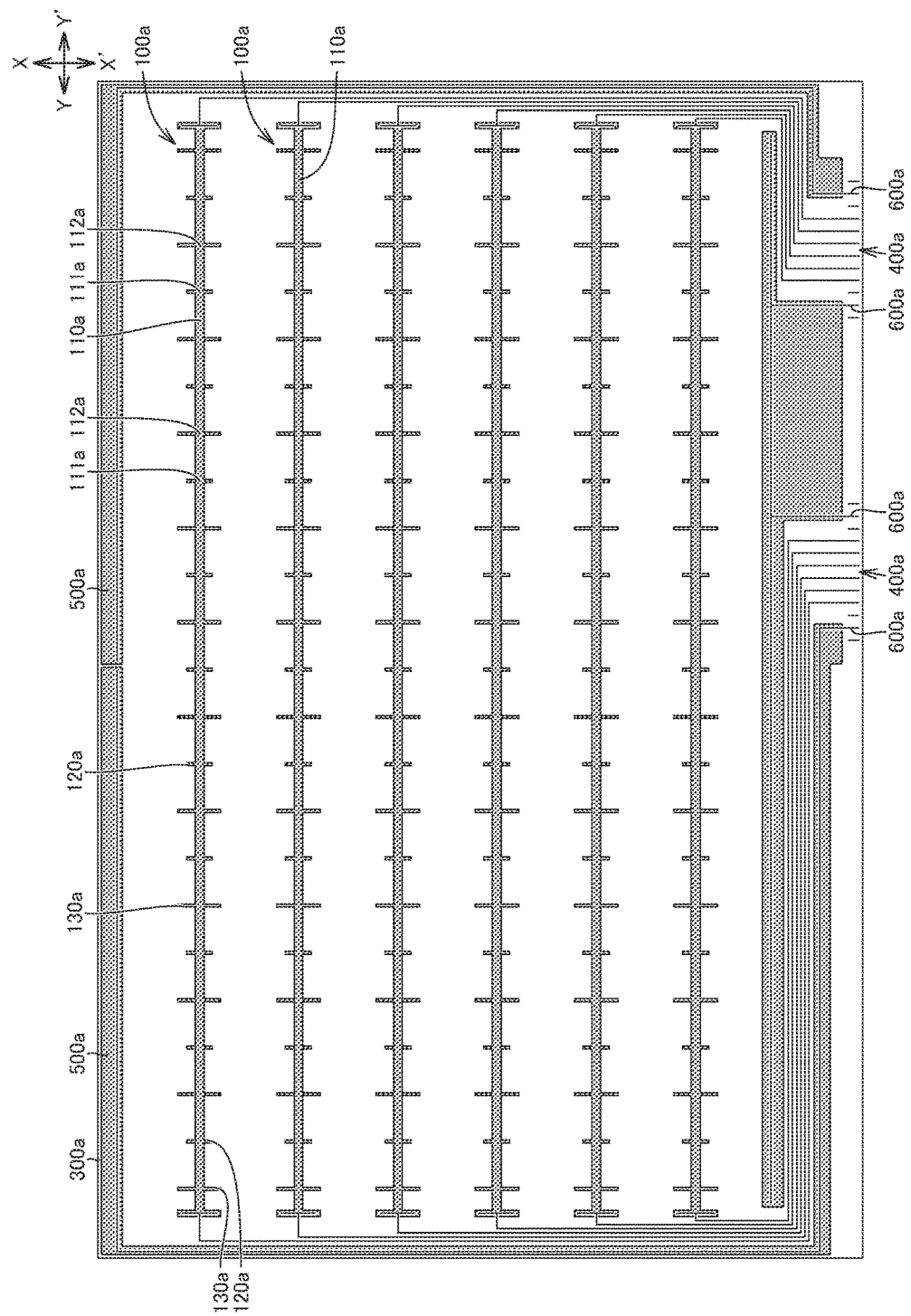
FIG. 2A is a schematic enlarged plan view of a first substrate of the touch sensing device according to the first embodiment, illustrating a positional relationship between first electrodes, first leads, and peripheral ground electrodes on the first substrate.
Figure 2B:
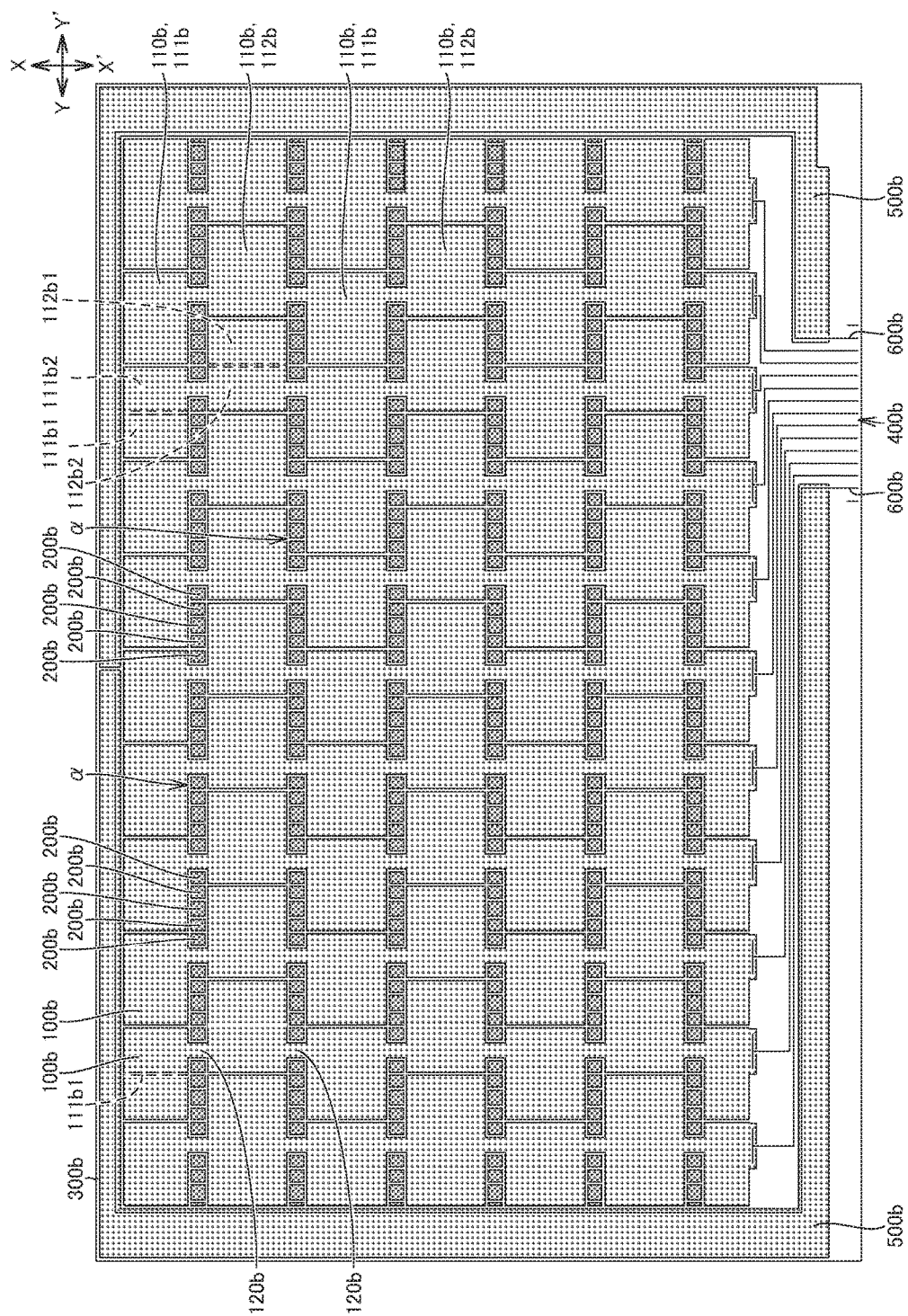
FIG. 2B is a schematic enlarged plan view of a second substrate of the touch sensing device according to the first embodiment, illustrating a positional relationship between second electrodes, ground electrodes, second leads, and peripheral ground electrodes on the second substrate.
Figure 3:
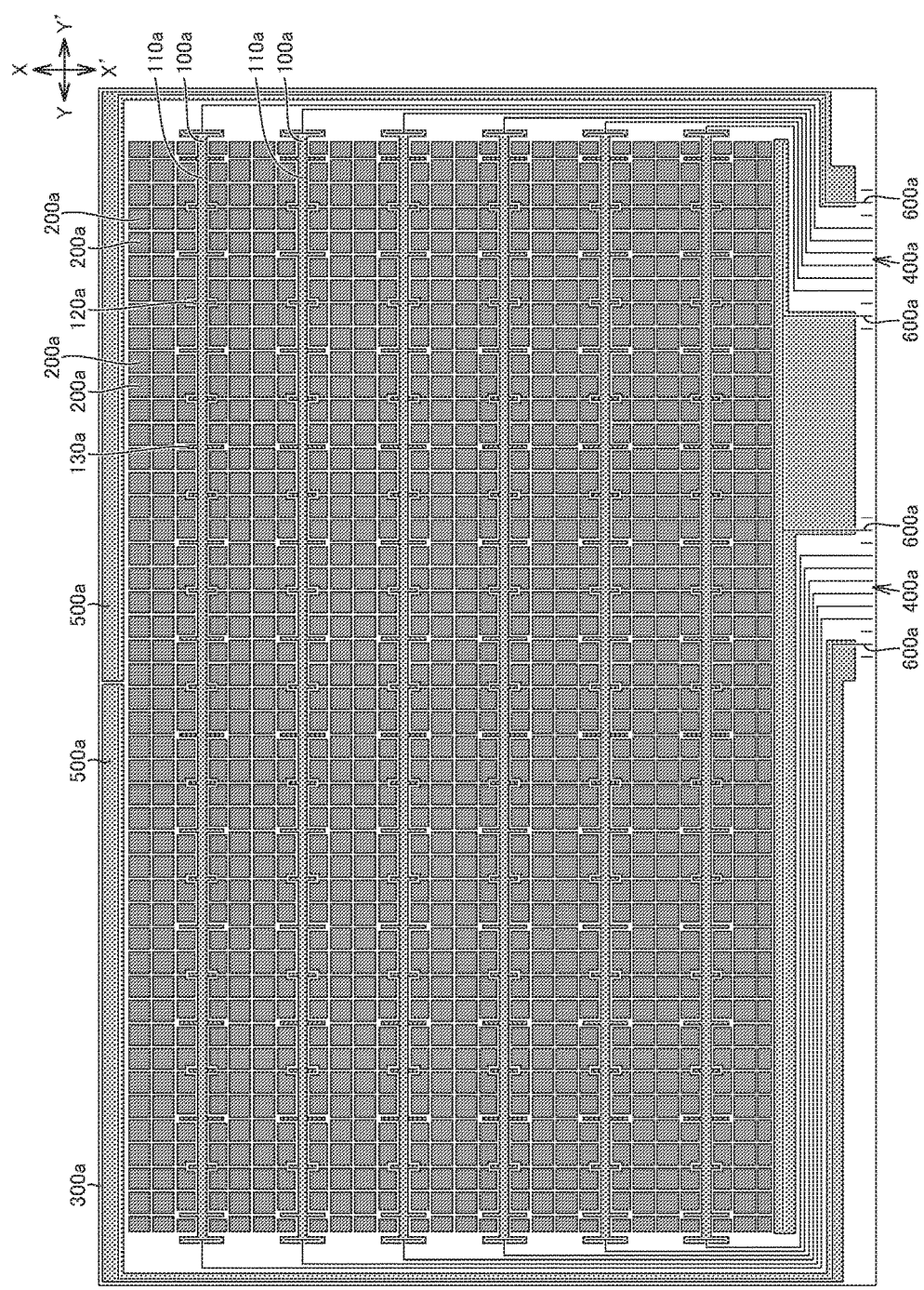
FIG. 3 is a view corresponding to FIG. 2A of a variant of the touch sensing device according to the first embodiment, illustrating a positional relationship between the first electrodes, the first leads, dummy electrodes, and peripheral ground electrodes on the first substrate.

A touch sensing device T according to the first and other embodiments of the invention will now be described with reference to FIG. 1A to FIG. 3. FIGS. 1A to 2B show the touch sensing device T of the first embodiment. FIG. 3 shows a variant of the touch sensing device T of the first embodiment. The X-X' direction indicated in FIGS. 1A, 2A, and 2B is the array direction of the first electrodes 100a of the touch sensing device T and corresponds to the first direction in the claims. In the X-X' direction, the X direction corresponds to one side of the first direction, and the X' direction corresponds to the other side of the first direction. The Y-Y' direction indicated in FIGS. 1A to 2B is the array direction of the second electrodes 100b of the touch sensing device T and corresponds to the second direction in the claims. The Y-Y' direction intersects the X-X' direction and may be perpendicular to the X-X' direction as shown in FIG. 1A to FIG. 2B. In the Y-Y' direction, the Y direction corresponds to one side of the second direction, and the Y' direction corresponds to the other side of the second direction. The Z-Z' direction indicated in FIGS. 1B and 1C is the thickness direction of the touch sensing device T. The Z-Z' direction is perpendicular to the X-X' and Y-Y' directions.

The touch sensing device T is a capacitive touch sensing device and may be disposed on the Z-direction side relative to an image display device D (on the light-emitting side of an image display device D). The touch sensing device T includes a plurality of first electrodes 100a and a plurality of second electrodes 100b. The first electrodes 100a may be detection electrodes (Tx electrodes), and the second electrodes 100b may be drive electrodes (Rx electrodes), as shown in FIG. 1A to FIG. 3. Alternatively, the first electrodes 100a may be drive electrodes (Rx electrodes), and the second electrodes 100b may be detection electrodes (Tx electrodes). It should be noted that FIG. 1A to FIG. 2B illustrate the first electrodes 100a and the second electrodes 100b with different half-tone dot patterns, but such dots are not actual visual or physical dots but shown for the purpose of distinction only.

The first electrodes 100a and the second electrodes 100b are transparent conductive films or conductors. The transparent conductive films may be made of a material such as tin-doped indium oxide (ITO), carbon nanotubes (CNT), indium-doped zinc oxide (IZO), aluminum-doped zinc oxide (AZO), or conductive polymers such as PEDOT and PSS. The conductors may specifically be photosensitive silver, silver nanoink, silver nanowires, vapor-deposited copper, rolled copper, copper nanoink, etc.

The first electrodes 100a are arrayed at a first height position in spaced relation in the X-X' direction. The first electrodes 100a include pairs of "adjacent first electrodes" 100a. The adjacent first electrodes 100a of each pair are located adjacent to each other in the X-X' direction. The first electrodes 100a may generally extend in the Y-Y' direction. The second electrodes 100b are arrayed at a second height position in spaced relation in the Y-Y' direction so as to intersect the first electrodes 100a. The second electrodes 100b include pairs of "adjacent second electrodes" 100b. The adjacent second electrodes 100b of each pair are located adjacent to each other in the Y-Y' direction. The second electrodes 100b may generally extend in the X-X' direction. The first height position and the second height position may be different height positions from each other in the Z-Z' direction. The first height position may be on the Z-direction side relative to the second height position as shown in FIGS. 1B and 1C, but it is not limited thereto.

The touch sensing device T with the above-described arrangement of the first electrodes 100a and the second electrodes 100b may specifically have one of the following configurations 1) to 3).

Configuration 1): As shown in FIGS. 1B to 1C, the touch sensing device T may further include a first substrate 300a and a second substrate 300b. The first substrate 300a and the second substrate 300b may each be a glass substrate or plastic film having a first face (the face facing the Z direction, hereinafter referred to as "Z-side face") and a second face (the face facing the Z' direction, hereinafter referred to as "Z'-side face"). The first substrate 300a and the second substrate 300b have enough optical transparency to allow a user to recognize visual information displayed by an image display device D through the first substrate 300a and the second substrate 300b. The first substrate 300a and the second substrate 300b may be entirely or partially transparent. As shown in FIG. 2A, the first electrodes 100a are arrayed in spaced relation along the X-X' direction on the first face of the first substrate 300a. As shown in FIG. 2B, the second electrodes 100b are arranged in spaced relation in the Y-Y' direction on the first face of the second substrate 300b. The second face of the first substrate 300a and the first face of the second substrate 300b are bonded together with an adhesive layer 700. As a result, the first electrodes 100a intersect the second electrodes 100b. In this configuration, the first face of the first substrate 300a is located and extends at the first height position, and the first face of the second substrate 300b is located and extends at the second height position. Also, the touch sensing device T may further include a cover panel P attached to the first face of the first substrate 300a with another adhesive layer 700 so as to cover the first electrodes 100a.

Configuration 2): The touch sensing device T may further include the first substrate 300a provided with the first electrodes 100a with the arrangement as described for the above configuration 1). The second electrodes 100b are arrayed in spaced relation along the Y-Y' direction on the second face of the first substrate 300a so as to intersect the first electrodes 100a. In this configuration, the first face of the first substrate 300a is located and extends at the first height position, and the second face of the first substrate 300a is located and extends at the second height position. Also, the touch sensing device T may further include a cover panel P attached to the first face of the first substrate 300a with another adhesive layer 700 so as to cover the first electrodes 100a.

Configuration: 3): The touch sensing device T may further include the second substrate 300b provided with the second electrodes 100b, with the arrangement as described for the above configuration 1), and an insulating layer (not shown). The insulating layer is provided on the first face of the second substrate 300b so as to cover the second electrodes 100b. The first electrodes 100a are arrayed in spaced relation along the X-X' direction on the face facing the Z direction ("Z-side face") of the insulating layer so as to intersect the second electrodes 100b. In this configuration, the Z-side face of the insulating layer is located and extends at the first height position, and the first face of the second substrate 300b is located and extends at the second height position. Also, the touch sensing device T may further include a cover panel P attached to the first face of the second substrate 300b with another adhesive layer 700 so as to cover the first electrodes 100a, the second electrodes 100b, the ground electrodes 200b and the insulating layer. It should be noted that the above-described cover panel P may be omitted in any configuration 1) to 3).

Each of the first electrodes 100a includes an electrode body 110a extending in the Y-Y' direction. The electrode body 110 may be strip-shaped. Each electrode body 110a includes a plurality of first overlapping portions 111a and a plurality of second overlapping portions 112a. The second overlapping portions 112a are each located between two of the first overlapping portions 111a.

Each of the second electrodes 100b includes a plurality of wide portions 110b and a plurality of narrow portions 120b. Each narrow portion 120b is smaller in Y-Y' direction dimension than each wide portion 110b. Each wide portion 110b may have any outer shape, which may be, for example, a polygonal shape (rectangle in FIG. 1A to FIG. 3) or a circular shape. The wide portions 110b of each second electrode 100b are located in spaced relation along the X-X' direction at the second height position and includes pairs of adjacent wide portions 110b. The adjacent wide portions 110b of each pair are adjacent to each other in the X-X' direction. The wide portions 110b do not overlap any electrode bodies 110a in the Z-Z' direction. In each pair of adjacent second electrodes 100b, the wide portions 110b of one of the second electrode 100b may preferably be directly next to the respective wide portions 110b of the other second electrode 100b leaving narrow clearances therebetween. In other words, every two wide portions 110b adjacent to each other in the in the Y-Y' direction may preferably be directly next to each other leaving narrow clearances therebetween. Each clearance may, but is not required to, be of width in the range of e.g. 10 µm to 100 µm.

In each second electrode 100b, each narrow portion 120b interconnects two adjacent ones of the wide portions 110b that are adjacent to each other at the second height position, and overlaps a corresponding first overlapping portion 111a of the electrode body 110a of the first electrode 100a in the Z-Z' direction. Each narrow portion 120b and the corresponding first overlapping portion 111a are electrostatically coupled by overlapping each other. It should be appreciated that each overlapping area is relatively small, so that each intersecting pair of a first electrode 100a and a second electrode 100b accordingly exhibits a relatively small electrostatic capacitance value. Each narrow portion 120b may be larger in X-X' direction dimension than the electrode body 110a of each first electrode 100a. For example, each narrow portion 120b may be larger in X-X' direction dimension than each electrode body 110a by 30 µm or more.

Moreover, the wide portions 110b of each second electrode 100b may include a plurality of first wide portions 111b and a plurality of second-wide portions 112b alternately arrayed in spaced relation along the X-X' direction at the second height position and staggered in the Y-Y' direction. More specifically, the first and second-wide portions may be arranged as follows. Each first wide portion 111b includes a first region 111b1 on the Y-direction side and a second region 111b2 on the Y'-direction side, and each second-wide portion 112b also includes a first region 112b1 on the Y'-direction side and a second region 112b2 on the Y-direction side. It is preferable that in each second electrode 100b, the second regions 111b2 of the first wide portions 111b coincide along the X-X' direction with the second regions 112b2 of the second-wide portions 112b, and that each narrow portion 120b interconnect at the second height position the second region 111b2 of a first wide portion 111b and the second region 112b2 of a second-wide portion 112b. Each pair of the "adjacent second electrodes" 100b described above may be referred to as a pair of "one" and "the other" second electrodes 100b. In each pair, the first regions 111b1 of the first wide portions 111b of the one second electrode 100b and the first regions 112b1 of the second-wide portions 112b of the other second electrode 100b coincide along the X-X' direction. In an embodiment, the sum of the total area of the first regions 111b1 of the first wide portions 111b of all the second electrodes 100b and the total area of the first regions 112b1 of the second-wide portions 112b of all the second electrodes 100b may occupy 10% to 90% of the total area of all the second electrodes 100b. In an embodiment, each wide portion 110b does not to include the first wide portion 111b and the second-wide portion 112b as described above. In other words, the wide portions 110b of each second electrode 100b may be located in spaced relation linearly along the X-X' direction.

Each pair of the adjacent second electrodes 100b is provided with a plurality of empty regions α arranged in spaced relation along the X-X' direction. "Each empty region α is defined by each set of two narrow portions 120b adjacent to each other in the Y-Y' direction ("paired narrow portions") and each set of "quaternary wide portions" 110b. Each set of quaternary wide portions 110b consists of two wide portions 110b on the X-direction side, which are located on the X-direction side with respect to the paired narrow portions 120b, and two wide portions 110b on the X'-direction side, which are located on the X'-direction side with respect to the paired narrow portions 120b. Each empty region α is located on the Z'-direction side relative to the corresponding second overlapping portion 112a of the electrode body 110a of the first electrode 100a. In other words, each second overlapping portion 112a overlaps the corresponding empty region α at the second height position.

In each set of the quaternary wide portions 110b surrounding an empty region α, each wide portions 110b includes an intermediate portion connected to a narrow portion 120b, a first end portion on the Y-direction side relative to the intermediate portion, and a second end portion on the Y'-direction side relative to the intermediate portion. In each set of the quaternary wide portions 110b, the two wide portions 110*b* on the X-direction side are the combination of a wide portion 110*b* on the Y-direction side ("Y-side wide portion") and a wide portion 110*b* on the Y'-direction side ("Y'-side wide portion"). The second end portion of the Y-side wide portion 100*b* and the first end portion of the Y'-side wide portion 110*b*, i.e. two end portions adjacent to each other in the Y-Y' direction, may preferably extend in the Y-Y' direction along, and directly on the X-direction side relative to, the corresponding second overlapping portion 112 of the first electrode 100*a*. The corresponding second overlapping portion 112 is located on the Z-direction side relative to the surrounded empty region α. In this case, the second end portion of the Y-side wide portion 100*b* and the first end portion of the Y'-side wide portion 110*b* can be electrostatically coupled to the corresponding second overlapping portion 112. Also in each set of the quaternary wide portions 110*b*, the two wide portions 110*b* on the X'-direction side are the combination of a wide portion 110*b* on the Y-direction side ("another Y-side wide portion") and a wide portion 110*b* on the Y'-direction side ("another Y'-side wide portion"). The second end portion of the another Y-side wide portion 100*b* and the first end portion of the another Y'-side wide portion 110*b*, i.e. two end portions adjacent to each other in the Y-Y' direction, may preferably extend in the Y-Y' direction along, and directly on X'-direction side relative to, the corresponding second overlapping portion 112 of the first electrode 100*a*. In this case, the second end portion of the another Y-side wide portion 100*b* and the first end portion of the another Y'-side wide portion 110*b* can be electrostatically coupled to the corresponding second overlapping portion 112.

The touch sensing device T may further include a plurality of second dummy electrodes 200*b*. It should be noted that FIGS. 1A, 1C, and 2B illustrate the second dummy electrodes 200*b* with a different half-tone dot pattern from those for the first electrodes 100*a* and the second electrodes 100*b*, but such dots are not actual visual or physical dots but shown for the purpose of distinction only.

The second dummy electrodes 200*b* are formed from a transparent conductive film or conductor of a material as described for the first and second electrodes 100*a* and 100*b*. Each second dummy electrode 200*b* may have any outer shape, which may be, for example, a polygonal shape (rectangle in FIG. 1A to FIG. 2B) or a circular shape. Each of the empty regions α is provided with at least one second dummy electrodes 200*b* at the second height position, which overlaps a corresponding one of the second overlapping portions 112*a* of the electrode bodies 110*a* of the first electrodes 100*a*. If the second electrodes 100*b* are arranged as described for the above configuration 1), the second dummy electrodes 200*b* are provided on the first face of the second substrate 300*b*. If the second electrodes 100*b* are arranged as described for the above configuration 2), the second dummy electrodes 200*b* are provided on the second face of the first substrate 300*a*. If the second electrodes 100*b* are arranged as described for the above configuration 3), the second dummy electrodes 200*b* are provided on the first face of the second substrate 300*b* and covered with the insulating layer. In the first embodiment, as shown in FIGS. 1A, 1C, and 2B, each empty region α is provided with a plurality of second dummy electrodes 200*b* (a set of the second dummy electrode 200*b*) at the second height position leaving narrow clearances therebetween, and each set of the second dummy electrode 200*b* overlaps a corresponding one of the second overlapping portions 112*a* of the electrode bodies 110*a* of the first electrodes 100*a*.

If each empty region α is provided with a single second dummy electrode 200*b*, the second dummy electrode 200*b* is disposed leaving narrow clearances in the Y-Y' direction from the corresponding paired narrow portions 120*b* surrounding the empty region α, and leaving narrow clearances in the X-X' direction from the corresponding quaternary wide portions 110*b* surrounding the empty region α. If each empty region α is provided with a plurality of second dummy electrodes 200*b* (a set of the second dummy electrode 200*b*), the second dummy electrodes 200*b* in each empty region α surrounded by the paired narrow portions 120*b* and the quaternary wide portions 110*b* are arranged leaving narrow clearances from the portions 120*b* and 110*b*. More particularly, the second dummy electrode 200*b* at the Y-direction end is disposed with a narrow clearance in the Y-Y' direction from one of the narrow portions 120*b* on the Y-direction side; the second dummy electrode 200*b* at the Y'-direction end is disposed with a narrow clearance in the Y-Y' direction from the other narrow portion 120*b* on the Y'-direction side; one or ones on the Y-direction side of the second dummy electrodes 200*b* (including the one at the Y-direction end) is disposed with a narrow clearance in the X-X' direction from the two on the Y-direction side of the quaternary wide portions 110*b*; and one or ones on the Y'-direction side of the second dummy electrodes 200*b* (including the one at the Y'-direction end) is disposed with a narrow clearance in the X-X' direction from the two on the Y'-direction side of the quaternary wide portions 110*b*. In short, each of the second dummy electrodes 200*b* is not connected to any of the paired narrow portions 120*b* or any of the quaternary wide portions 110*b* surrounding the empty region α, i.e. each second dummy electrode 200*b* floats electrically.

In each empty regions α, each clearance between the narrow portion 120*b* on the Y-direction side and the adjacent second dummy electrode 200*b* and between the narrow portion 120*b* on the Y' direction side and the adjacent second dummy electrode 200*b* may preferably be, but not required to be, of width in a range from 10 µm to 100 µm; likewise, each clearance between the two wide portions 110*b* on the Y-direction side and the adjacent second dummy electrode(s) 200*b* on the Y-direction side and between the two wide portions 110*b* on the Y'-direction side and the adjacent second dummy electrode(s) 200*b* on the Y'-direction side may preferably be, but not required to be, of width in a range from 10 µm to 100 µm. If each empty region α is provided with a plurality of second dummy electrodes 200*b*, each clearance between the second dummy electrodes 200*b* in each set may preferably be, but not required to be, of width in a range from 10 µm to 100 µm.

In the region at the second height position for arranging the second electrodes 100*b* and the second dummy electrodes 200*b* (the region will be referred to as the "electrode region"), the second electrodes 100*b* and the second dummy electrodes 200*b* may preferably occupy 90% to 99% of the second electrode region. In other words, the clearances described above may preferably occupy 20% to 1% of the second electrode region. The second electrode region may be defined by the endmost second electrode 100*b* in the Y direction, the endmost second electrode 100*b* in the Y' direction, the X-direction ends of the second electrodes 100*b*, and the X'-direction ends of the second electrodes 100*b*. However, this is merely an example, and the second electrode region can be defined in any manner. If each empty region α is provided with a single second dummy electrode 200*b*, the total area of the clearances may preferably be the sum of the total area of the clearances between the adjacent wide portions 110b of the second electrodes 100b, the total area of the clearances between the second dummy electrodes 200b in the empty regions α and the corresponding paired narrow portions 120b surrounding the empty regions α, and the total area of the clearances between the second dummy electrodes 200b in the empty regions α and the corresponding quaternary wide portions 110b surrounding the empty regions α. If each empty region α is provided with a plurality of second dummy electrodes 200b, the total area of the clearances may preferably be the sum of the total area of the clearances between the adjacent wide portions 110b of the second electrodes 100b, the total area of the clearances between the second dummy electrodes 200b at the Y-direction ends in the empty regions α and the corresponding narrow portions 120b on the Y-direction side, the total area of the clearances between the second dummy electrodes 200b at the Y'-direction ends in the empty regions α and the corresponding narrow portions 120b on the Y'-direction side, the total area of the clearances between the second dummy electrodes 200b in the empty regions α and the every two wide portions 110b on the Y-direction side, and the total area of the clearances between the second dummy electrodes 200b in the empty regions α and the every two wide portions 110b on the Y'-direction side.

Each second dummy electrode 200b may be larger in X-X' direction dimension than the electrode body 110a of each first electrode 100a. For example, each second dummy electrode 200b may be larger in X-X' direction dimension than each electrode body 110a by 30 μm or more. The second dummy electrodes 200b may be omitted.

The first electrode 100a may further include a plurality of first branches 120a and/or a plurality of second branches 130a. Each first branch 120a extends at the first height position, in the X-X' direction from the X- or X'-direction end of the corresponding first overlapping portion 111a of an electrode body 110a. For convenience of explanation, a first branch 120a extending in the X direction from the X-direction end of a first overlapping portion 111a will be hereinafter referred to as an "X-side first branch" 120a, and a first branch 120a extending in the X' direction from the X'-direction end of a first overlapping portion 111a will be referred to as an "X'-side first branch" 120a.

Each X-side first branch 120a overlaps, in the Z-Z' direction, a part of the second electrode 100b that is next to, particularly directly on the X-direction side relative to, the corresponding first overlapping portion 111a. The "part" of the second electrode 100b may be a part of the narrow portion 120b overlapped by the corresponding first overlapping portion 111a, the part being on the X-direction side relative to the first overlapping portion 111a. Alternatively, as shown in FIG. 1A, the "part" of the second electrode 100b may be such part of the narrow portion 120b, plus the wide portion 110b that is contiguous to, and on the X-direction side relative to, said portion of the narrow portion 120b. Each X'-side first branch 120a overlaps, in the Z-Z' direction, a part of the second electrode 100b that is next to, particularly directly on the X'-direction side relative to, the corresponding first overlapping portion 111a. The "part" of the second electrode 100b may be a part of the narrow portion 120b overlapped by the corresponding first overlapping portion 111a, the part being on the X'-direction side relative to the first overlapping portion 111a. Alternatively, as shown in FIG. 1A, the "part" of the second electrode 100b may be such portion of the narrow portion 120b, plus the wide portion 110b that is contiguous to, and on the X'-direction side relative to, said portion of the narrow portion 120b.

If increasing the length (the X-X' direction dimension in FIGS. 1A and 2A) of each first branch 120a of a first electrode 100a and/or the width thereof (the Y-Y' direction dimension in FIGS. 1A and 2A), the area and accordingly its electrostatic capacitance is increased where the first electrode 100a intersects and overlaps each second electrode 100b. If decreasing the length and/or the width of each first branch 120a, the area and accordingly its electrostatic capacitance is decreased where the first electrode 100a intersects and overlaps each second electrode 100b. This means that adjusting and setting the length and/or width of each first branch 120a allows adjusting the electrostatic capacitance of each intersecting pair of first and second electrodes 100a and 100b to a desired value (for example, in a range of 0.1 pF to 5 pF).

Each second branch 130a extends at the first height position, in the X-X' direction from the X- or X'-direction end of the corresponding second overlapping portion 112a of an electrode body 110a. For convenience of explanation, a second branch 130a extending in the X direction from the X-direction end of a second overlapping portion 112a will be hereinafter referred to as a "X-side second branch" 130a, and a second branch 130a extending in the X' direction from the X'-direction end of a second overlapping portion 112a will be referred to as a "X'-side second branch" 130a.

Each X-side second branch 130a overlaps in the Z-Z' direction one of the wide portions 110b that is located directly on the X-direction side relative to the second overlapping portion 112a connected to the same second branch 130a. Each X'-side second branch 130a overlaps in the Z-Z' direction one of the wide portions 110b that is located directly on the X'-direction side relative to the second overlapping portion 112a connected to the same second branch 130a.

Each second branch 130a overlaps, and therefore can be electrostatically coupled to, the corresponding wide portion 110b. If increasing the length (the X-X' direction dimension in FIGS. 1A and 2A) of each second branch 130a and/or the width thereof (the Y-Y' direction dimension in FIGS. 1A and 2A), the area of the second branch 130a overlapping the corresponding wide portion 110b accordingly increases, strengthening electrostatic coupling therebetween. If decreasing the length and/or the width of each second branch 130a, the area of the second branch 130a overlapping the corresponding wide portion 110b accordingly decreases, weakening electrostatic coupling therebetween. This means that adjusting and setting the length and/or width of each second branch 130a allows improvement of the detection sensitivity near the second branch 130a. It should be noted that the first branches 120a and/or the second branches 130a may be omitted.

The touch sensing device T may further include a plurality of first leads 400a and a plurality of second leads 400b. The first leads 400a are lead wires respectively connected to the electrode bodies 110a of the first electrodes 100a at the first height position. If the first electrodes 100a are arranged as described for the above configuration 1) or 2), the first leads 400a may preferably be provided on the first face of the first substrate 300a. If the first electrodes 100a are arranged as described for the above configuration 3), the first leads 400a may preferably be provided on the Z-side face of the insulating layer. The second leads 400b are lead wires respectively connected to the second electrodes 100b at the second height position. If the second electrodes 100b are arranged as described for the above configuration 1) or 3), the second leads 400b may preferably be provided on the first face of the second substrate 300b. If the second electrode 100b are arranged as described for the above configuration 2), the second leads 400b may preferably be provided on the second face of the first substrate 300a.

The first leads 400a and the second leads 400b may be connected to a detector 10 (e.g. a detector IC or the like). If connected, the leads 400a, 400b may be connected to the detector 10 directly or indirectly via an external connection member 20 (e.g. a flexible circuit board or the like). The external connection member 20 includes: a plurality of first connection lines connectable to the respective first leads 400a and a plurality of second connection lines connectable to the respective second leads 400b. The first and second connection lines are connected to the detector 10.

The detector 10 sequentially supplies driving pulses to the drive electrodes, amplifies signals (voltages or currents) sequentially output from the detection electrodes in response to the driving pulses, and determines whether or not the signals which have been amplified (hereinafter referred to as amplified signals) exceed a threshold value stored in a memory of the detector 10. When a detection target, such as a finger and a touch pen, approaches (or touches) any of points of the above-described electrostatic coupling between the first electrodes 100a and the second electrodes 100b, then an electrostatic capacitance at the approach point changes, and a signal output from the detection electrode at the approach point changes. When the detector 10 amplifying output signals from the detection electrodes determines that any of the amplified signal exceeds the threshold value, the detector 10 detects that a detection target has approached the point of electrostatic coupling between the drive electrode supplying the driving pulse and the detection electrode outputting the output signal. When sequentially supplying drive pulses to the drive electrodes, the detector 10 may preferably set each drive electrode, when not supplied with driving pulses (that is, when not driven), at the same level as that of the ground. Also, the memory of the detector 1 stores an upper limit value for amplified signals, and when any amplified signal exceeds the upper limit value, the detector 10 is brought into a saturated state.

The touch sensing device T may further include at least one peripheral ground electrode 500a and/or at least one peripheral ground electrode 500b. It should be noted that the peripheral ground electrodes 500a, 500b are omitted in FIG. 1A for convenience of illustration. However, FIG. 2A shows peripheral ground electrodes 500a, and FIG. 2B shows peripheral ground electrodes 500b. It should also be noted that FIGS. 2A and 2B illustrate the peripheral ground electrodes 500a, 500b with different half-tone dot patterns, but such dots are not actual visual or physical dots but shown for the purpose of distinction only.

As best shown in FIG. 2A, the at least one peripheral ground electrode 500a may preferably be disposed at the first height position so as to surround the first electrodes 100a. If the first electrode 100a are arranged as described for the above configuration 1) or 2), the at least one peripheral ground electrode 500a may preferably be provided on the first face of the first substrate 300a. If the first electrodes 100a are arranged as described for the above configuration 3), the at least one peripheral ground electrode 500a may preferably be provided on the Z-side face of the insulating layer. The first leads 400a may preferably be provided between the at least one peripheral ground electrode 500a and the first electrodes 100a. The at least one peripheral ground electrode 500a may be arranged so as to overlap the second leads 400b at least partly in the Z-Z' direction. In the first embodiment as shown in 1A to 2B, the at least one peripheral ground electrode 500a is provided in plurality.

As best shown in FIG. 2B, the at least one peripheral ground electrode 500b may preferably be disposed at the second height position so as to surround the second electrodes 100b and the second dummy electrodes 200b. If the second electrodes 100b are arranged as described for the above configuration 1) or 3), the at least one peripheral ground electrode 500b may preferably be provided on the first face of the second substrate 300b. If the second electrodes 100b arranged as described for the above configuration 2), the at least one peripheral ground electrode 500b may preferably be provided on the second face of the first substrate 300a. The second leads 400b may preferably be provided between the at least one peripheral ground electrode 500b and the second electrodes 100b. The at least one peripheral ground electrode 500b may be arranged so as to overlap the first leads 400a at least partly in the Z-Z' direction. In the first embodiment as shown in 1A to 2B, the at least one peripheral ground electrode 500b is provided in plurality. It is possible to omit the peripheral ground electrode 500a and/or the peripheral ground electrode 500b.

The touch sensing device T may further include at least one third lead 600a and/or at least one fourth lead 600b. The at least one third lead 600a may preferably be connected to the at least one peripheral ground electrode 500a. If the at least one peripheral ground electrode 500a is provided on the first face of the first substrate 300a, the at least one third lead 600a may preferably be also provided on the first face of the first substrate 300a. If the at least one peripheral ground electrode 500a is provided on the Z-side face of the insulating layer, the at least one third lead 600a may preferably be also provided on the Z-side face of the insulating layer.

The at least one fourth lead 600b may preferably be connected to the at least one peripheral ground electrode 500b. If the at least one peripheral ground electrode 500b is provided on the first face of the second substrate 300b, the at least one fourth lead 600b may preferably be also provided on the first face of the second substrate 300b. If the at least one peripheral ground electrode 500b is provided on the second face of the first substrate 300a, the at least one fourth lead 600b may preferably be also provided on the second face of the first substrate 300a. The third lead 600a and the fourth lead 600b are also connectable to the detector 10 directly or indirectly via the external connection member 20. It is possible to omit the at least one third lead 600a and/or the at least one fourth lead 600b.

FIG. 3 shows another embodiment of the touch sensing device T, which further includes a plurality of first dummy electrodes 200a. It should be noted that FIG. 3 illustrates the first electrodes 100a, the first dummy electrodes 200a, and the peripheral ground electrode 500a with different half-tone dot patterns, but such dots are not actual visual or physical dots but shown for the purpose of distinction only.

The first dummy electrodes 200a include a plurality of sets of first dummy electrodes 200a. The first dummy electrodes 200a of each set are arrayed at the first height position, between two adjacent ones of the first electrodes 100a leaving narrow clearances from each other and from each of these two first electrodes 100a. If the first electrodes 100a are arranged as described for the above configuration 1) or 2), the first dummy electrodes 200a may preferably be provided on the first face of the first substrate 300a. If the first electrodes 100a are arranged as described for the above configuration 3), the first dummy electrodes 200a may preferably be provided on the Z-side face of the insulating layer.

In the region at the first height position for arranging the first electrodes 100a and the first dummy electrodes 200a (the region will be referred to as the "first electrode region"), the first electrodes 100a and the first dummy electrodes 200a may preferably occupy 80% to 99% of the first electrode region. In other words, the clearances between the first electrodes 100a and the first dummy electrodes 200a and between the first dummy electrodes 200a may preferably occupy 20% to 1% of the first electrode region. The first electrode region may be defined by the Y-direction ends of the first electrodes 100a, the Y'-direction ends of the first electrodes 100a, the first dummy electrodes 200a at the endmost row in the X direction, and the first dummy electrodes 200a at the endmost row in the X' direction. However, this definition is merely an example, and the first electrode region can be defined in any manner. The first dummy electrodes 200a may be omitted.

The touch sensing device T as described above has at least the following technical features and effects. First, the touch sensing device T exhibit improved detection sensitivity for the following reason. The narrow portions 120b of the second electrodes 100b overlap the first overlapping portions 111a of the electrode bodies 110a of the first electrodes 100a, i.e. the overlapping areas of the first electrodes 100a and the second electrodes 100b are relatively small. The above technical feature makes it possible to reduce the electrostatic capacitance at each intersection of the first electrodes 100a and the second electrodes 100b. Accordingly, even if the touch sensing device T is configured such that signals output either from the first electrodes 100a or the second electrodes 100b are input into the detector 10 and amplified by the detector 10, a possibility is reduced that the amplified signals exceed the upper limit value set in the detector 10. This makes it possible to amplify signals output from the first or second electrodes to a maximum degree, resulting in improved sensitivity of the touch sensing device T.

Second, in the touch sensing device T, variation in detection sensitivity is suppressed throughout the detection plane compared to conventional devices, such as a touch sensing device of a comparative example (not shown) having reed/strip shaped first electrodes in parallel arrangement and reed/strip shaped second electrodes arranged orthogonally to, and at a different height position from, the first electrodes. In this comparative example, electrostatic coupling is strong at the intersections of the first and second electrodes, leading to relatively higher detection sensitivity at such intersections. On the other hand, electrostatic coupling is weak at areas without the first and second electrodes, leading to relatively lower detection sensitivity at such areas, i.e. different detection sensitivity from that at the intersections. This is in contrast with the touch sensing device T. Particularly, i) the first overlapping portions 111a of the first electrodes 100a overlap, and are electrostatically coupled to, the narrow portions 120b of the second electrodes 100b. Accordingly, it is possible to detect an approach of a detection target in any the overlapping points and also in any of the areas surrounding the empty regions α. This is because in each set of the quaternary wide portions 110b surrounding a empty region α, the two wide portions 110b on the X-direction side have the end portions adjacent in the Y-Y' direction extend along, and directly on X-direction side relative to, and are electrostatically coupled to the corresponding second overlapping portion 112 of the first electrode 100a; likewise, the two wide portions 110b on the X'-direction side have the end portions adjacent in the Y-Y' direction extend along, and directly on X'-direction side relative to, and are electrostatically coupled to the corresponding second overlapping portion 112 of the first electrode 100a. ii) Moreover, variation in detection sensitivity is further reduced if each pair of the adjacent second electrodes 100b are configured such that the first regions 111b1 of the first wide portions 111b of the one second electrode 100b and the first regions 112b1 of the second-wide portions 112b of the other second electrode 100b coincide along the X-X' direction, and if the sum of the total area of the first regions 111b1 of the first wide portions 111b of all the second electrodes 100b and the total area of the first regions 112b1 of the second-wide portions 112b of all the second electrodes 100b occupies 10% to 90% of the total area of all the second electrodes 100b. In this case, each pair of the adjacent second electrodes 100b are arranged such that the in-between areas between the second regions 111b2 of the first wide portions 111b of the one second electrode 100b and the first regions 111b1 of the first wide portions 111b of the other second electrode 100b (i.e. the in-between areas between the adjacent first wide portions 111b in the second direction) are located close to the respective intersections where the narrow portions 120b connected to the first wide portions 111b of the one second electrode 100b cross the corresponding first overlapping portions 111a of the first electrodes 100a; likewise, the in-between areas between the first regions 112b1 of the second-wide portions 112b of the one second electrode 100b and the second regions 112b2 of the second-wide portions 112b of the other second electrode 100b (i.e. the in-between areas between the adjacent second-wide portions 112b2 in the second direction) are located close to the respective intersections where the narrow portions 120b connected to the second-wide portions 112b2 of the other second electrode 100b cross the corresponding first overlapping portions 111a of the first electrodes 100a. In this arrangement, when a detection target approaches one of the above-described adjacent first wide portions 111b, the nearest intersection can detect the approach, and when a detection target approaches one of the above-described adjacent second-wide portions 111b, the nearest intersection can detect the approach. This leads to reduced variation in detection sensitivity from the above in-between areas to the above intersections.

Third, the touch sensing device is improved in invisibility of the first electrodes. Particularly, if each narrow portion 120b of the second electrodes 100b overlaps the corresponding first overlapping portion 111a of the electrode bodies 110a of the first electrodes 100a, and if the at least one second dummy electrode 200b in each empty regions α overlaps the corresponding second overlapping portion 112a of the electrode bodies 110a of the first electrodes 100a, the wiring pattern of the first electrodes is unlikely to be visible from outside of the touch sensing device.

Fourth, the touch sensing device T allows each intersecting pair of first and second electrodes 100a and 100b to exhibit a desired value. Particularly, the above first technical feature may cause excessive reduction in electrostatic capacitance of each intersecting pair of first and second electrodes 100a and 100b. However, the electrostatic capacitance can be increased if the first electrodes 100a each include the first branches 120a. By adjusting and setting the length and/or width of each first branch 120a, it is possible to enlarge the overlapping area of each intersecting pair of first and second electrodes 100a and 100b and thereby adjust the electrostatic capacitance of the intersecting first and second electrodes 100a and 100b to a desired value.

Fifth, the touch sensing device T allows fine adjustments of the sensitivity. Particularly, as the quaternary wide portions 110b of each set do not overlap the corresponding second overlapping portion 112a in the Z-Z' direction, sensitivity at this portion (the vicinity of the corresponding empty region α) may be lower than sensitivity at the portion including (the intersection of) each narrow portion 120b of the second electrodes 100b and each first overlapping portion 111a of the first electrodes 100a. However, if each of the first electrodes 100a includes the second branches 130a, each second branch 130a overlaps, and is electrostatically coupled to, the corresponding wide portion 110b, resulting in improved sensitivity around each second branch 130a. It is also possible to match the sensitivity around each second branch 130a with the sensitivity at each intersection described above, by adjusting and setting the length and/or width of each second branch 130a.

Sixth, the touch sensing device T is resistant to electromagnetic interference from the Z' direction side, such as interference of noise from an image display device D, for the following reasons. i) If each narrow portion 120b of the second electrodes 100b and each second dummy electrode 200b are larger in X-X' direction dimension than the electrode body 110a of each first electrode 100a, the narrow portions 120b of the second electrodes 100b and the second dummy electrodes 200b cover corresponding electrode bodies 110a from the Z' direction. Hence, the narrow portions 120b of the second electrodes 100b and the second dummy electrodes 200b serve to reduce electromagnetic interference with the electrode bodies 110a of the first electrodes 100a from the Z' direction." 'ii) If the second electrodes 100b and the second dummy electrodes 200b occupy 80% to 99% of the second electrode region, this means that most of the area of the second electrode region is occupied with the second electrodes 100b and the second dummy electrodes 200b. In this case, the second electrodes 100b and the second dummy electrodes 200b serve to reduce electromagnetic interference with the first electrodes 100a from the Z' direction side.

Seventh, it is possible to reduce a possibility of distortion in the substrate provided with the second electrodes 100b and the second dummy electrodes 200b for the following reasons i) to iii). i) In the touch sensing device of the comparative example described above, an area without a second electrode alternates with an area with a second electrode within the substrate. In this case, there may be differences in thermal expansion and/or thermal contraction of the substrate between areas with second electrodes and areas without second electrodes, which may result in deformation of the substrate in accordance with the shapes of the second electrodes. This is in contrast with the touch sensing device T, the second electrodes 100b each include the wide portions 110b and the narrow portions 120b, leaving a zigzag shaped clearance between adjacent two of the second electrodes 100b. More particularly, if each pair of the adjacent second electrodes 100b are arranged such that, the first regions 111b1 of the first wide portions 111b of the one second electrode 100b and the first regions 112b1 of the second-wide portions 112b of the other second electrode 100b coincide along the X-X' direction, the clearance between the one and the other of the adjacent second electrodes 100b is zigzag shaped. Therefore, the substrate is rendered resistant to distortion when thermally expanding and/or contracting. ii) The second dummy electrodes 200b, if each provided between the corresponding adjacent second electrodes 100b, contribute further reduction of the areas without electrodes, so that the substrate provided with the second electrodes 100b and the second dummy electrodes 200b is rendered resistant to distortion. iii) Moreover, if 80% to 99% of the second electrode region is occupied with the second electrodes 100b and the second dummy electrodes 200b, there is almost no area in the second electrode region that is not occupied with any second electrodes 100b or any second dummy electrodes 200b, so that the substrate provided with the second electrodes 100b and the second dummy electrodes 200b rendered resistant to distortion. Similarly, to the second electrode region, if 80% to 99% of the first electrode region is occupied with the first electrodes 100a and the first dummy electrodes 200a, the substrate provided with the first electrodes 100a and the first dummy electrodes 200a rendered resistant to distortion.

Eighth, the touch sensing device T is further resistant to electromagnetic interference from the Z direction side, such as interference of noise from outside of the touch sensing device T, if the touch sensing device T includes the first dummy electrodes 200a. The eighth technical feature and effect are improved if 80% to 99% of the first electrode region is occupied with the first electrodes 100a and the first dummy electrodes 200a.

It should be noted that the touch sensing device of the invention is not limited to the embodiments described above but may be modified in any manner within the scope of the claims. Some modification examples will be described below.

In each of the empty regions of the invention may be provided with a plurality of second dummy electrodes leaving narrow clearances therebetween in the X-X' direction.

The touch sensing device of the invention may further include one or more third substrates between the first substrate and the second substrate.

The first leads of the invention may be provided at a height position different from the first height position. In this case, the first leads may preferably be connected to the respective first electrodes via first connecting means, such as throughhole electrodes in a substrate. The second leads of the invention may be provided at a height position different from the second height position. In this case, the second leads may preferably be connected to the respective second electrodes via second connecting means, such as throughhole electrodes in a substrate. Also, the first electrodes and/or the second electrodes of the invention may be connected to other connecting means, such as pins and at least one cable, in place of the first leads and/or the second leads. The third and/or the fourth leads may be modified in various manners similarly to the first leads and other parts of the invention.

The touch sensing device of the invention may be curved at least partly. In this case, the first height position of the invention may be a position on the first face of the first substrate 300a that is at least partially curved or a position on the Z-side face of the insulating layer that is at least partially curved. Likewise, the second height position of the invention may be a position on the first face of the second substrate 300b that is at least partially curved or a position on the second face of the first substrate 300a that is at least partially curved.

It should be appreciated that the materials, the shapes, the dimensions, the number, the positions, etc. of the elements of the touch sensing devices in the above-described embodiments and their variants are presented by way of example only and can be modified in any manner as long as the same functions can be fulfilled. The aspects and variants of the above-described embodiments can be combined in any possible manner. The first direction of the invention may be any direction along which the first electrodes of the invention are arrayed. The second direction of the invention may be any direction intersecting the first direction. The Z-Z' direction (third direction) of the invention may be any direction that intersects the first and second directions and that is located on a different plane from the plane where the first and second directions are located.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

REFERENCE SIGNS LIST

T: touch sensing device
100a: first electrode
110a: electrode body
111a: first overlapping portion
112a: second overlapping portion
120a: first branch
130a: second branch
100b: second electrode
110b: wide portion
111b: first wide portion
112b: second-wide portion
120b: narrow portion
200a: first dummy electrode
200b: second dummy electrode
300a: first substrate
300b: second substrate
400a: first lead
400b: second lead
500a: peripheral ground electrode
500b: peripheral ground electrode
600a: third lead
600b: fourth lead
700: adhesive layer
P: cover panel
10: detector
20: external connection member
D: image display device

What is claimed is:
1. A touch sensing device comprising:
a plurality of first electrodes arrayed at a first height position in spaced relation along a first direction, the first electrodes each including an electrode body of strip shape extending in a second direction at a first height position, the second direction intersecting the first direction, and the electrode body of each first electrode including a plurality of first overlapping portions; and
a plurality of second electrodes being arrayed at a second height position in spaced relation along the second direction and intersecting the first electrodes, the second height position being a different height position from the first height position in a third direction, the third direction intersecting the first and second directions and not being located on a plane on which the first and second directions are located, the second electrodes each including:
a plurality of wide portions arrayed at the second height position in spaced relation along the first direction and including pairs of adjacent wide portions, the adjacent wide portions of each pair being located adjacent to each other in the first direction, and
a plurality of narrow portions located at the second height position, each of the narrow portions being smaller in dimension in the second direction than each wide portion, interconnecting the adjacent wide portions of a corresponding pair, and overlapping a corresponding one of the first overlapping portions of the first electrodes,
wherein the first electrodes each further include a plurality of branches, the branches of each first electrode extending at the first height position from the electrode body so as to each overlap, at the first height position, a part of one of the second electrodes that is next to said electrode body.

2. The touch sensing device according to claim 1, wherein the branches of the first electrodes include a plurality of first branches, the first branches of each first electrode extending at the first height position from a corresponding one of the first overlapping portions of the electrode body so as to each overlap, at the first height position, at least a corresponding one of the narrow portions of the second electrodes that is next to said first overlapping portion.

3. The touch sensing device according to claim 2, wherein the first branches include:
a plurality of first branches, each extending from the corresponding first overlapping portions to one side of the first direction, and
another plurality of first branches, each extending from the corresponding first overlapping portions to the other side of the first direction.

4. The touch sensing device according to claim 2, wherein
the wide portions of each second electrode include a plurality of first wide portions and a plurality of second-wide portions, the first and second-wide portions being alternately arrayed in spaced relation along the first direction at the second height position and being staggered in the second direction,
the first wide portions each include a first region on one side in the second direction and a second region on the other side in the second direction,
the second-wide portions each include a first region on the other side of the second direction and a second region on the one side of the second direction,
in each second electrode, the second regions of the first wide portions and the second regions of the second-wide portions coincide along the first direction,
the adjacent second electrodes of each pair comprises one and the other second electrodes,
the first regions of the first wide portions of the one second electrode and the first regions of the second-wide portions of the other second electrode coincide along the first direction, and
the sum of the total area of the first regions of the first wide portions of all the second electrodes and the total area of the first regions of the second-wide portions of all the second electrodes occupies 10% to 90% of the total area of all the second electrodes.

5. The touch sensing device according to claim 1, wherein the first electrodes include pairs of adjacent first electrodes, the adjacent first electrodes of each pair being located adjacent to each other in the first direction,
the touch sensing device further comprises a plurality of first dummy electrodes including a plurality of sets of first dummy electrodes, and
the first dummy electrodes of each set are located at the first height position between two adjacent ones of the first electrodes leaving narrow clearances from each of said two first electrodes.

6. The touch sensing device according to claim 1, wherein an electrostatic capacitance value of each intersecting pair of the first electrodes and the second electrodes is in a range of 0.1 pF to 5 pF.

7. The touch sensing device according to claim 1, wherein the branches of the first electrodes include a plurality of second branches, the second branches of each first electrode extending at the first height position from a corresponding one of the second overlapping portions of the electrode body so as to each overlap, at the first height position, at least a corresponding one of the wide portions of the second electrodes that is next to said second overlapping portion.

8. A touch sensing device comprising:
a plurality of first electrodes arrayed at a first height position in spaced relation along a first direction, the first electrodes each including an electrode body of strip shape extending in a second direction at a first height position, the second direction intersecting the first direction, and the electrode body of each first electrode including a plurality of first overlapping portions; and
a plurality of second electrodes being arrayed at a second height position in spaced relation along the second direction and intersecting the first electrodes, the second height position being different from the first height position, the second electrodes each including:
a plurality of wide portions arrayed at the second height position in spaced relation along the first direction and including pairs of adjacent wide portions, the adjacent wide portions of each pair being located adjacent to each other in the first direction, and
a plurality of narrow portions located at the second height position, each of the narrow portions being smaller in dimension in the second direction than each wide portion, interconnecting the adjacent wide portions of a corresponding pair, and overlapping a corresponding one of the first overlapping portions of the first electrodes, wherein
the second electrodes include pairs of adjacent second electrodes, the adjacent second electrodes of each pair being located adjacent to each other in the second direction with a plurality of empty regions therebetween,
each empty region is defined by a pair of paired narrow portions and a set of quaternary wide portions, the paired narrow portions of each pair consisting of two of the narrow portions that are adjacent in the second direction, the quaternary wide portions of each set consisting of four of the wide portions and including:
two wide portions located next to, and on one side of the first direction relative to, the corresponding paired narrow portions; and
other two wide portions located next to, and on the other side of the first direction relative to, the paired narrow portions,
the electrode body of each of the first electrodes further includes a plurality of second overlapping portions, each of the second overlapping portions being located between corresponding two of the first overlapping portions and overlapping a corresponding one of the empty regions at the first height position,
the touch sensing device further includes a plurality of second dummy electrodes, and
each of the empty regions is provided with at least one of the second dummy electrodes at the second height position, the at least one second dummy electrode in each empty region electrically floats and overlaps a corresponding one of the second overlapping portions of the first electrodes.

9. The touch sensing device according to claim 8, wherein in each set of the quaternary wide portions, the two wide portions have end portions that are adjacent in the second direction and extend along, and directly on the one side of the first direction relative to, the corresponding one of the second overlapping portions that overlaps the corresponding empty region, and the other two wide portions have end portions that are adjacent in the second direction and extend along, and directly on the other side of the first direction relative to, the corresponding one of the second overlapping portions that overlaps the corresponding empty region.

10. The touch sensing device according to claim 8, wherein the first electrodes each further include a plurality of first branches, the first branches each extending at the first height position from a corresponding one of the first overlapping portions of the electrode body so as to overlap a part of one of the second electrodes that is next to said first overlapping portion.

11. The touch sensing device according to claim 10, wherein the first branches include:
a plurality of first branches, each extending from the corresponding first overlapping portions to one side of the first direction, and
another plurality of first branches, each extending from the corresponding first overlapping portions to the other side of the first direction.

12. The touch sensing device according to claim 8, wherein the first electrodes each further include a plurality of second branches, the second branches each extending at the first height position from a corresponding one of the second overlapping portions of the electrode body so as to overlap a corresponding one of the wide portions that is next to said second overlapping portion.

13. The touch sensing device according to claim 12, wherein the second branches include:
a plurality of second branches, each extending from the corresponding second overlapping portions to one side of the first direction, and
another plurality of second branches, each extending from the corresponding second overlapping portions to the other side of the first direction.

14. The touch sensing device according to claim 12, wherein
the wide portions of each second electrode include a plurality of first wide portions and a plurality of second-wide portions, the first and second-wide portions being alternately arrayed in spaced relation along the first direction at the second height position and being staggered in the second direction, the first wide portions each include a first region on one side in the second direction and a second region on the other side in the second direction, the second-wide portions each include a first region on the other side of the second direction and a second region on the one side of the second direction, in each second electrode, the second regions of the first wide portions and the second regions of the second-wide portions coincide along the first direction, the adjacent second electrodes of each pair comprises one and the other second electrodes, the first regions of the first wide portions of the one second electrode and the first regions of the second-wide portions of the other second electrode coincide along the first direction, and the sum of the total area of the first regions of the first wide portions of all the second electrodes and the total area of the first regions of the second-wide portions of all the second electrodes occupies 10% to 90% of the total area of all the second electrodes.

15. The touch sensing device according to claim 8, wherein the wide portions of each second electrode include a plurality of first wide portions and a plurality of second-wide portions, the first and second-wide portions being alternately arrayed in spaced relation along the first direction at the second height position and being staggered in the second direction, the first wide portions each include a first region on one side in the second direction and a second region on the other side in the second direction, the second-wide portions each include a first region on the other side of the second direction and a second region on the one side of the second direction, in each second electrode, the second regions of the first wide portions and the second regions of the second-wide portions coincide along the first direction, the adjacent second electrodes of each pair comprises one and the other second electrodes, the first regions of the first wide portions of the one second electrode and the first regions of the second-wide portions of the other second electrode coincide along the first direction, and the sum of the total area of the first regions of the first wide portions of all the second electrodes and the total area of the first regions of the second-wide portions of all the second electrodes occupies 10% to 90% of the total area of all the second electrodes.

16. A touch sensing device comprising:

a plurality of first electrodes arrayed at a first height position in spaced relation along a first direction, the first electrodes each including an electrode body of strip shape extending in a second direction at a first height position, the second direction intersecting the first direction, and the electrode body of each first electrode including a plurality of first overlapping portions; and a plurality of second electrodes being arrayed at a second height position in spaced relation along the second direction and intersecting the first electrodes, the second height position being different from the first height position, the second electrodes each including a plurality of wide portions arrayed at the second height position in spaced relation along the first direction and including pairs of adjacent wide portions, the adjacent wide portions of each pair being located adjacent to each other in the first direction, and a plurality of narrow portions located at the second height position, each of the narrow portions being smaller in dimension in the second direction than each wide portion, interconnecting the adjacent wide portions of a corresponding pair, and overlapping a corresponding one of the first overlapping portions of the first electrodes, wherein the second electrodes include pairs of adjacent second electrodes, the adjacent second electrodes of each pair being located adjacent to each other in the second direction with an empty region therebetween, each empty region is defined by a pair of paired narrow portions and a set of quaternary wide portions, the paired narrow portions of each pair consisting of two of the narrow portions that are adjacent in the second direction, the quaternary wide portions of each set consisting of four of the wide portions and including:

two wide portions located next to, and on one side of the first direction relative to, the corresponding paired adjacent narrow portions; and other two wide portions located next to, and on the other side of the first direction relative to, the paired adjacent narrow portions, the electrode body of each of the first electrodes further includes a plurality of second overlapping portions, each of the second overlapping portions being located between corresponding two of the first overlapping portions and overlapping a corresponding one of the empty regions at the first height position, and in each set of the quaternary wide portions, the two wide portions have end portions that are adjacent in the second direction and extend along, and directly on the one side of the first direction relative to, the corresponding one of the second overlapping portions that overlaps the corresponding empty region, and the other two wide portions have end portions that are adjacent in the second direction and extend along, and directly on the other side of the first direction relative to, the corresponding one of the second overlapping portions that overlaps the corresponding empty region.

17. The touch sensing device according to claim 16, wherein the first electrodes each further include a plurality of first branches, the first branches each extending at the first height position from a corresponding one of the first overlapping portions of the electrode body so as to overlap a part of one of the second electrodes that is next to said first overlapping portion.

18. The touch sensing device according to claim 16, wherein the first electrodes each further include a plurality of second branches, the second branches each extending at the first height position from a corresponding one of the second overlapping portions of the electrode body so as to overlap a corresponding one of the wide portions that is next to said second overlapping portion.

19. The touch sensing device according to claim 18, wherein the second branches include:

a plurality of second branches, each extending from the corresponding second overlapping portions to one side of the first direction, and another plurality of second branches, each extending from the corresponding second overlapping portions to the other side of the first direction.

20. The touch sensing device according to claim 16, wherein the wide portions of each second electrode include a plurality of first wide portions and a plurality of second-wide portions, the first and second-wide portions being alternately arrayed in spaced relation along the first direction at the second height position and being staggered in the second direction, the first wide portions each include a first region on one side in the second direction and a second region on the other side in the second direction, the second-wide portions each include a first region on the other side of the second direction and a second region on the one side of the second direction, in each second electrode, the second regions of the first wide portions and the second regions of the second-wide portions coincide along the first direction, the adjacent second electrodes of each pair comprises one and the other second electrodes, the first regions of the first wide portions of the one second electrode and the first regions of the second-wide portions of the other second electrode coincide along the first direction, and the sum of the total area of the first regions of the first wide portions of all the second electrodes and the total area of the first regions of the second-wide portions of all the second electrodes occupies 10% to 90% of the total area of all the second electrodes.

21. A touch sensing device comprising:
a plurality of first electrodes arrayed at a first height position in spaced relation along a first direction, the first electrodes each including an electrode body of strip shape extending in a second direction at a first height position, the second direction intersecting the first direction, and the electrode body of each first electrode including a plurality of first overlapping portions; and
a plurality of second electrodes being arrayed at a second height position in spaced relation along the second direction and intersecting the first electrodes, the second height position being different from the first height position, the second electrodes each including:
a plurality of wide portions arrayed at the second height position in spaced relation along the first direction and including pairs of adjacent wide portions, the adjacent wide portions of each pair being located adjacent to each other in the first direction, and
a plurality of narrow portions located at the second height position, each of the narrow portions being smaller in dimension in the second direction than each wide portion, interconnecting the adjacent wide portions of a corresponding pair, and overlapping a corresponding one of the first overlapping portions of the first electrodes, wherein the wide portions of each second electrode include a plurality of first wide portions and a plurality of second wide portions, the first and second wide portions being alternately arrayed in spaced relation along the first direction at the second height position and being staggered in the second direction, the first wide portions each include a first region on one side in the second direction and a second region on the other side in the second direction, the second-wide portions each include a first region on the other side of the second direction and a second region on the one side of the second direction, in each second electrode, the second regions of the first wide portions and the second regions of the second-wide portions coincide along the first direction, the adjacent second electrodes of each pair comprises one and the other second electrodes, the first regions of the first wide portions of the one second electrode and the first regions of the second-wide portions of the other second electrode coincide along the first direction, and the sum of the total area of the first regions of the first wide portions of all the second electrodes and the total area of the first regions of the second-wide portions of all the second electrodes occupies 10% to 90% of the total area of all the second electrodes.

* * * * *